(12) United States Patent
Kanaris

(10) Patent No.: US 12,157,639 B2
(45) Date of Patent: Dec. 3, 2024

(54) CONVEYOR DRIVE ROLLER WITH REPLACEABLE CONVEYOR DRIVE SURFACE

(71) Applicant: Van der Graaf Inc., Brampton (CA)

(72) Inventor: Alexander D. Kanaris, Richmond Hill (CA)

(73) Assignee: Van der Graaf Inc., Brampton (CA)

( * ) Notice: Subject to any disclaimer, the term of this patent is extended or adjusted under 35 U.S.C. 154(b) by 64 days.

(21) Appl. No.: 18/079,394

(22) Filed: Dec. 12, 2022

(65) Prior Publication Data

US 2023/0227265 A1    Jul. 20, 2023

(30) Foreign Application Priority Data

Jan. 14, 2022  (CA) ..................................... 3145566
Dec. 2, 2022   (CA) ..................................... 3183304

(51) Int. Cl.
*B65G 39/07* (2006.01)
*B65G 23/06* (2006.01)
*B65G 23/08* (2006.01)
*B65G 39/09* (2006.01)

(52) U.S. Cl.
CPC ............. *B65G 39/07* (2013.01); *B65G 23/06* (2013.01); *B65G 23/08* (2013.01); *B65G 39/09* (2013.01)

(58) Field of Classification Search
CPC ........ B65G 39/07; B65G 23/06; B65G 23/08; B65G 39/09
USPC .................................... 198/780, 832; 193/37
See application file for complete search history.

(56) References Cited

U.S. PATENT DOCUMENTS

| 3,853,214 | A  | * | 12/1974 | Vinarcsik | ............... B65G 39/09 |
| | | | | | 492/15 |
| 3,941,238 | A  |   | 3/1976  | Lapeyre   | |
| 5,451,198 | A  | * | 9/1995  | Lancaster | ................ G03C 1/74 |
| | | | | | 492/57 |
| 6,394,943 | B1 | * | 5/2002  | Cormier   | ................ B41F 27/105 |
| | | | | | 29/895.23 |
| 6,443,295 | B1 |   | 9/2002  | Hill      | |
| 7,753,193 | B2 |   | 7/2010  | Kanaris   | |
| 9,341,213 | B2 | * | 5/2016  | Sheridan  | ................. F16C 13/00 |
| 2004/0163934 | A1 |   | 8/2004  | Kanaris | |
| 2012/0073103 | A1 | * | 3/2012 | March    | ................... C03B 35/181 |
| | | | | | 29/402.08 |

(Continued)

FOREIGN PATENT DOCUMENTS

CN    110395529    11/2019
CN    212798378    3/2021

(Continued)

OTHER PUBLICATIONS

European Search Report for Application No. 22214352.1 dated Jun. 14, 2023, (9 pages).

(Continued)

*Primary Examiner* — James R Bidwell
(74) *Attorney, Agent, or Firm* — Boyle Fredrickson, S.C.

(57) ABSTRACT

A conveyor drive roller with a replaceable sleeve defining a conveyor drive surface adapted to operatively engage a conveyor belt. The replaceable sleeve may be replaced with another replaceable sleeve defining another conveyor drive surface adapted to operatively engage another conveyor belt. A method of replacing the conveyor drive surface on the conveyor drive roller is also disclosed.

22 Claims, 6 Drawing Sheets

(56) References Cited

U.S. PATENT DOCUMENTS

2014/0113784 A1* 4/2014 Sheridan ................ F16C 13/00
492/45

FOREIGN PATENT DOCUMENTS

| CN | 213325316 | 6/2021 |
| CN | 216470449 | 5/2022 |
| JP | 2000335727 | 12/2000 |

OTHER PUBLICATIONS

SSV Sanitary Drum Motors; 2016 Van der Graaf Inc., Van Der Graaf Drum Motors (1 page).

* cited by examiner

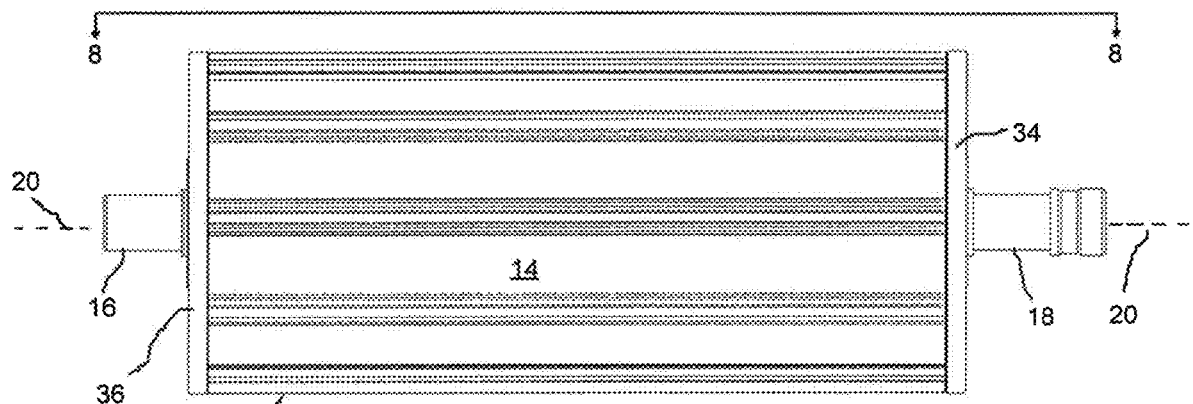
Fig. 1
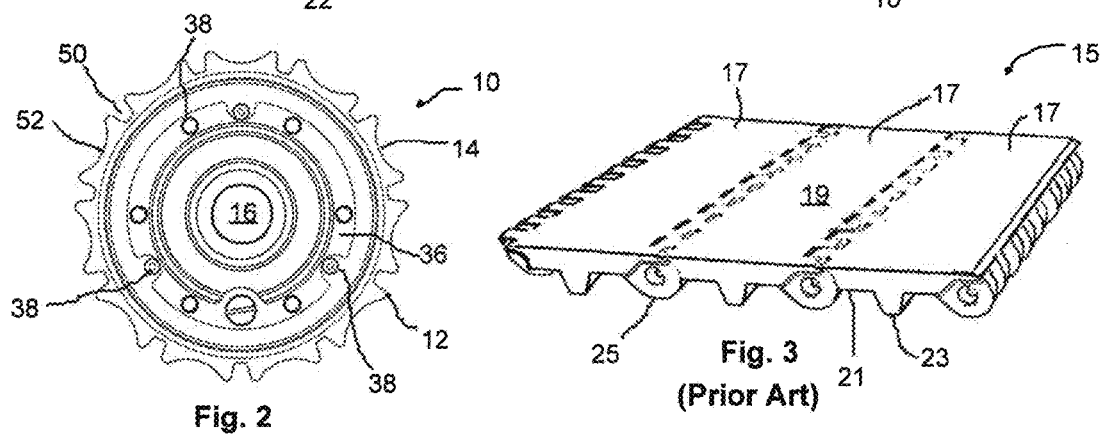
Fig. 2
Fig. 3
(Prior Art)
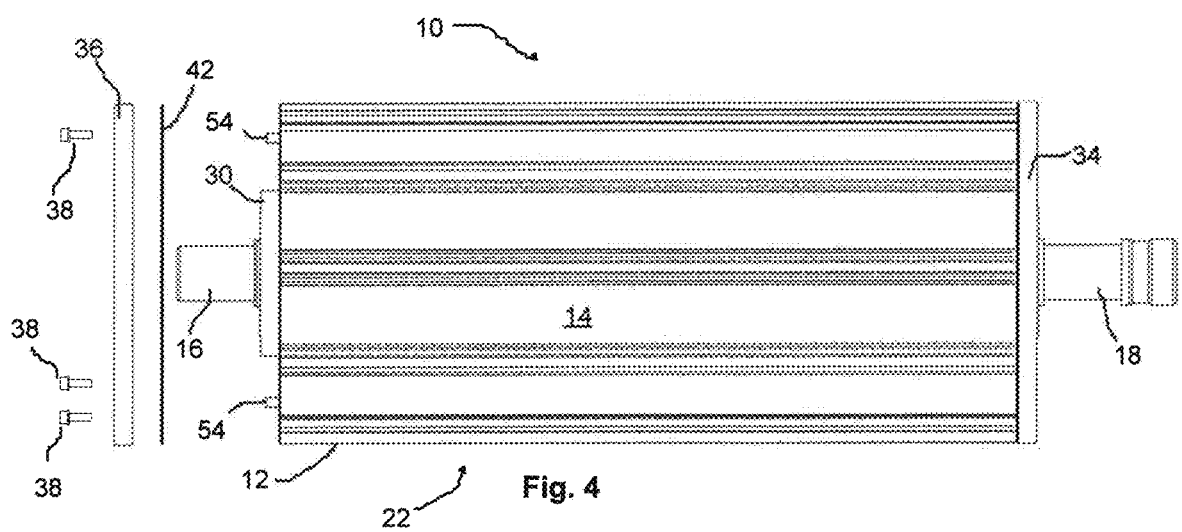
Fig. 4

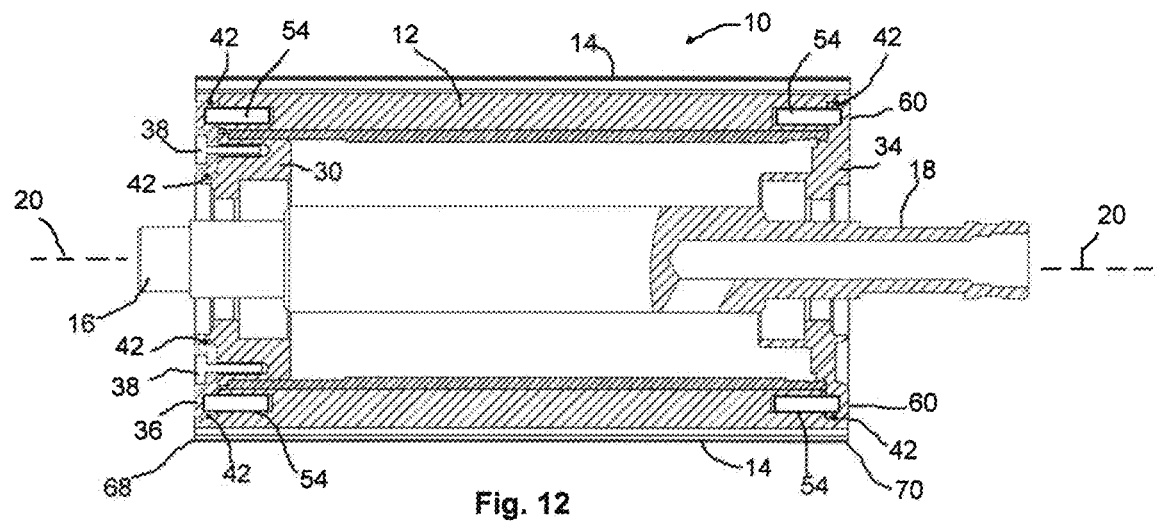
Fig. 12
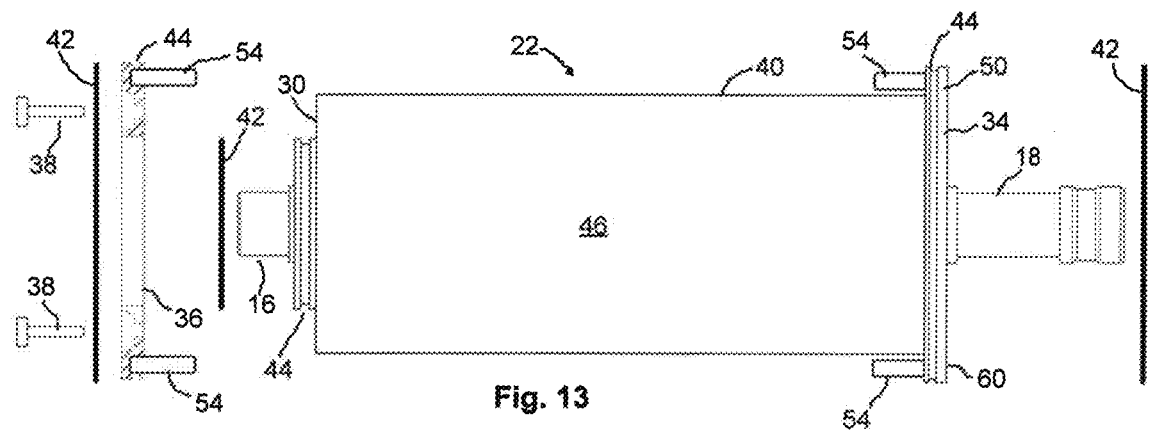
Fig. 13
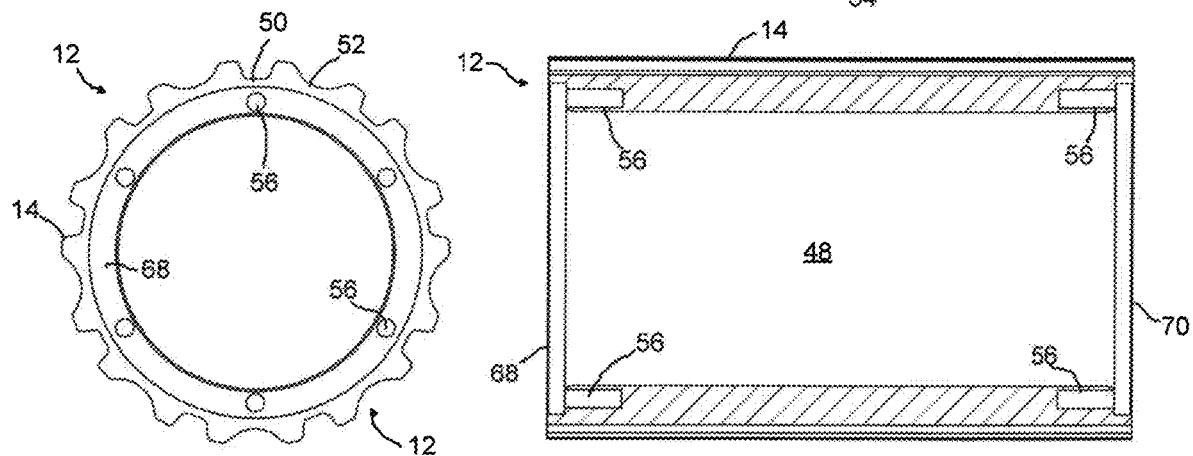
Fig. 14
Fig. 15

CONVEYOR DRIVE ROLLER WITH REPLACEABLE CONVEYOR DRIVE SURFACE

FIELD OF THE INVENTION

The present invention relates generally to conveyor systems. More particularly, the present invention relates to conveyor drive rollers for driving conveyor belts.

BACKGROUND OF THE INVENTION

Conveyor systems are found in a wide variety of industries, as they are an important part of materials handling. A wide variety of conveyor systems have been developed for use in reliably, and efficiently transporting various items from one location to another location.

In food processing environments, and other hygienic environments, conveyor system designs must take into account sanitary design considerations, in addition to mechanical design considerations. Conveyor systems that are not adequately cleaned and sanitized can be a source of microorganisms that cause food spoilage and foodborne illness. These microorganisms may be bacteria, moulds, yeast, viruses, parasites, or combinations thereof.

Thus, it is desirable for sanitary conveyor systems to have sanitary surfaces made from, for example, stainless steel, polyurethane, acetal high density polyethylene (HDPE), nylon, and the like, and present few, if any, crevices or other collection points for contaminants, which are difficult to clean and form breeding grounds for microorganisms.

Ease of sanitizing and cleaning are also important aspects of sanitary conveyor systems. Sanitary conveyor systems need to withstand the day-to-day sanitary routine of an operation, and limit the downtime for dismantling, sanitizing and cleaning.

Sprockets are an integral part of the conveyor system, and as such make up a large part of the prior art.

U.S. Pat. No. 3,941,238 to Lapeyre is an example of a prior art attempt to provide a sanitary conveyor belt driven by sprockets. The conveyor belt construction has one or more longitudinal notched grooves which defines a tracking and aligning groove which mates with a multi-faceted aligning member arranged polygonally about the perimeter of the sprockets which support the conveyor belt to preserve its alignment with the drive sprockets. The sprockets are driven in a conventional manner with a square shaft construction. The Lapeyre design presents several collection points for contaminants, including crevices between the square shaft and the square collars of the sprockets, the corners formed between the teeth, the triangular shaped vertical guide, and the sprocket. Moreover, according to local health codes in many jurisdictions, designs such as Lapeyre in which the sprockets may be disassembled from the square shaft, are typically required to be dismantled for cleaning and sanitization periodically. Cleaning and sanitization can take a significant amount of time to complete. For example, it is not uncommon for cleaning and sanitization to take 45 minutes to an hour to complete. In some cases, cleaning and sanitization must be done as often as three times a day, or between shifts.

Improvements in conveyor systems have led to the development of motorized conveyor drive designs replacing square drive shaft constructions with cylindrical pulley drums with axially opposite end plates enclosing an electric motor and drive transmission, such as for example U.S. Pat. No. 6,443,295 to Hill. Furthermore, U.S. Pat. No. 7,753,193 to Kanaris disclosed a key sprocket drive system for a conveyor belt having a drive drum having an outer surface. However, the problems with crevices and collection points for contaminants along the sprockets, and requirement for periodic dismantling for cleaning and sanitization, which are so problematic for the food handling industry, remained.

Additional improvements lead Van der Graaf Inc. to the development of conveyor drum motors having a profiled conveyor drive surface. The SSV™ sanitary drum motors were designed for hygienic belt conveyor applications where sanitization and food safety are paramount. As in the above noted Hill patent, all drive components of the drum motor including the electric motor and gear reducer, are enclosed inside the drum. Furthermore, the SSV™ sanitary drum motors feature an IP69K sealing system that can withstand up to 3,000 psi of pressure washdown.

Unlike the Hill patent, Van der Graaf Inc.'s SSV™ sanitary drum motors have the profile of the bottom surface of the conveyor belt machined directly onto the surface of a drum made from stainless steel or other materials, to drive modular, wire mesh and monolithic thermoplastic conveyor belts without the use of sprockets. In many cases, the triangular shaped vertical guide taught by Lapeyre for its sprocket designs can also be omitted.

The profiled conveyor drive surface featured in the SSV™ sanitary drum motors eliminates gaps and crevices for food by-products to accumulate and bacteria to harbor, and cuts washdown time by 50%, minimizing downtime and reducing water consumption. As an additional benefit, because there are no sprockets or other parts that can be disassembled, the SSV™ sanitary drum motors do not need to be dismantled for cleaning and sanitization, which aids in minimizing downtime. Furthermore, since the SSV™ sanitary drum motor is a sealed unit, it can be "cleaned in place", with high pressure washers, without fear of damaging the unit, or electricity risks to workers.

One problem with the Van der Graaf Inc. SSV™ sanitary drum motors is that because the profile of the conveyor belt bottom surface is machined directly onto the surface of the drum, if the operator is supplied with a conveyor belt that has a different bottom surface belt profile, they will need to change out the entire SSV™ sanitary drum motor for one that is complementary to the new conveyor belt, which is an expensive proposition.

Therefore, there is a continuing need for improvement in the design of conveyor drive rollers.

SUMMARY OF THE INVENTION

What is desired is a conveyor drive roller that overcomes at least some of the problems with prior art conveyor drive rollers.

The present invention is directed to a conveyor drive roller with a replaceable sleeve defining a conveyor drive surface adapted to operatively engage a conveyor belt, which may be easily and cost effectively replaced with another sleeve defining another conveyor drive surface adapted to operatively engage another conveyor belt.

Therefore, in accordance with one aspect of the present invention, there is disclosed a conveyor drive roller for driving a conveyor belt in a conveyor system, said conveyor drive roller comprising:

a rotatable body associated with a means to rotate said rotatable body;

a pair of retainers attached to opposed first and second ends of said rotatable body, at least one of said retainers being removably attached to said first end of said rotatable body; and a replaceable sleeve releasably retained on said rotatable body by said removable retainer and said other retainer, said replaceable sleeve defining a continuous conveyor drive surface extending between said removable retainer and said other retainer;

wherein said replaceable sleeve is rotationally locked to a rotation of said rotatable body.

In accordance with another aspect of the present invention, there is disclosed a method of replacing a conveyor drive surface on a conveyor drive roller, said method comprising the steps of:

providing said conveyor drive roller defined above;

removing said at least one removable retainer from said rotatable body with a tool;

removing said replaceable sleeve from said rotatable body;

placing another replaceable sleeve on said rotatable body; and securing said at least one removable retainer to said rotatable body with said tool.

BRIEF DESCRIPTION OF THE DRAWINGS

Reference will now be made to the preferred embodiments of the present invention with reference, by way of example only, to the following drawings in which:

FIG. 1 is a front view of a conveyor drive roller with a replaceable sleeve defining a conveyor drive surface, according to an embodiment of the present invention;

FIG. 2 is a left side view of the conveyor drive roller of FIG. 1, showing the replaceable sleeve retained on the conveyor drive roller by a retaining member;

FIG. 3 is a perspective view of a portion of a prior art modular chain conveyor belt;

FIG. 4 is a front view of the conveyor drive roller of FIG. 1, showing the retaining member disassembled from the conveyor drive roller allowing the replaceable sleeve to be removed;

FIG. 12 is a cross-sectional view of a conveyor drive roller according to another embodiment of the present invention;

FIG. 13 is an exploded view of the conveyor drive roller of FIG. 12, with the replaceable sleeve removed;

FIG. 14 is a left side view of the replaceable sleeve of FIG. 12, the right side view being a mirror image thereof;

FIG. 15 is a cross-sectional view of the replaceable sleeve of FIG. 12.

DETAILED DESCRIPTION OF THE PREFERRED EMBODIMENTS

Figure 5:
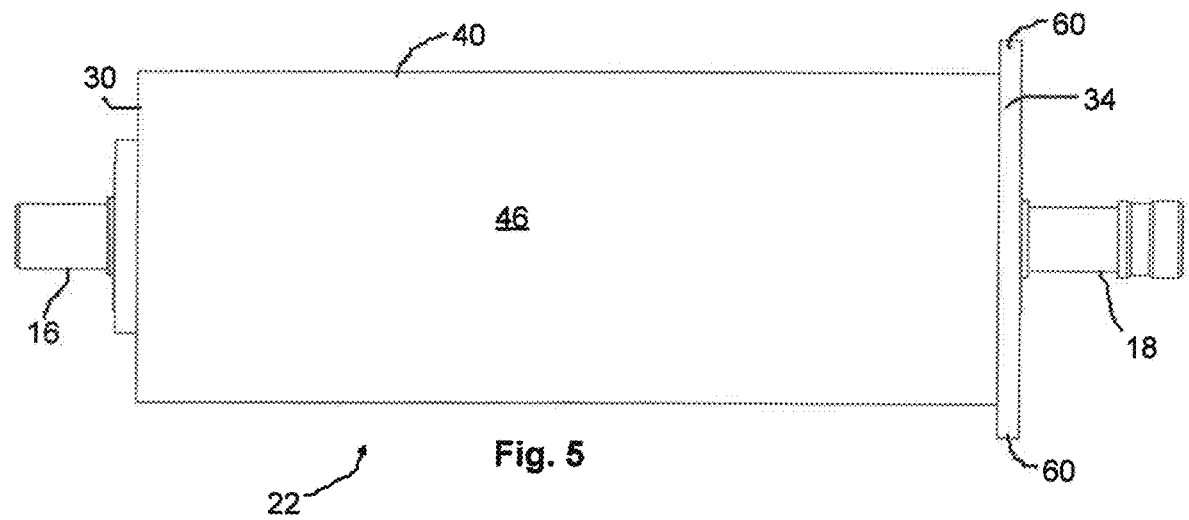
FIG. 5 is a front view of FIG. 4, after the retaining member and replaceable sleeve have been removed.

The present invention is described in more detail with reference to exemplary embodiments thereof as shown in the appended drawings. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein. In the figures, like elements are given like reference numbers. For the purposes of clarity, not every component is labelled in every figure, nor is every component of each embodiment of the invention shown where illustration is not necessary to allow those of ordinary skill in the art to understand the invention. Orientative words such as, for example, "top", "bottom", "front", and "side" as used herein are used for clarity with reference to the orientation of elements in the figures and are not intended to be limiting.

FIGS. 1 and 2 respectively show a front and a side view of a conveyor drive roller 10 according to an embodiment of the present invention. The conveyor drive roller 10 includes a replaceable sleeve 12, which defines a conveyor drive surface 14. The conveyor drive surface 14 is adapted to operatively engage a conveyor belt 15, to allow the conveyor drive roller 10 to move the conveyor belt in the desired direction.

As used herein, the term conveyor belt 15 comprehends all forms of belts used in conveyor belt systems, including rubber belts, metal (i.e. steel) cord conveyor belts, textile conveyor belts, solid woven conveyor belts, metal (i.e. steel) mesh conveyor belts, metal (i.e. steel) chain conveyor belts, plastic chain conveyor belts, modular conveyor belts, and the like. An example of a modular chain conveyor belt 15 is illustrated in FIG. 3, which shows a section of the conveyor belt 15 having three panels 17.

All such conveyor belts have a top surface 19, which is configured to support and move material (not shown), and a bottom surface 21. The bottom surface 21 of a conveyor belt 15 is engaged by the conveyor drive means, such as for example a square drive shaft and driven sprocket arrangement (not shown), or more preferably, a conveyor drive roller, such that rotation of the driven sprocket or conveyor drive roller, as the case may be, translates into linear motion of the conveyor belt 15 in the desired direction.

Often times, the bottom surface 21 of the conveyor belt 15 is a flat, and otherwise featureless surface which is frictionally engaged (i.e. gripped), by the rotating conveyor drive roller simply by action of friction between the conveyor surface and the bottom surface of the conveyor belt. Selection of material forming the conveyor belt, or at least the bottom surface thereof, can aid in increasing (or decreasing) the degree of frictional engagement to a desired level.

Other times the bottom surface 21 of the conveyor belt 15 is provided with surface features such as for example, ridges 23, grooves, notches, connectors, such as hinges 25, and combinations thereof, sized and shaped for engagement by complementary surface features on sprockets. By way of example, U.S. Pat. No. 3,941,238 (Lapeyre) teaches a conveyor belt in which the bottom surface comprises regularly spaced transverse notches for engagement by teeth on a drive sprocket, and one or more longitudinal notched tracking and aligning grooves for engagement by aligning members on the sprocket arranged between the sprocket teeth.

However, conveyor belt manufacturers use many different surface features in the bottom surfaces 21 of their conveyor belts 15, and in fact the same conveyor belt 15, intended for the same purpose may be provided in different versions having different surface features incorporated in their bottom surfaces 21. Indeed, the conveyor belt manufacturer may decide to discontinue a conveyor belt 15 having certain surface features in its bottom surface 21, and offer in its place a new version which has different surface features in its bottom surface 21.

This is often less problematic for operators of conveyor belt systems based on the square drive shaft and driven sprocket arrangement, such as the one disclosed in the above noted U.S. Pat. No. 3,941,238, because it is relatively straightforward, and inexpensive, to replace old sprockets with new ones which are designed to be compatible with the surface features in the bottom surface of the new version of the conveyor belt.

However, it can be problematic for operators of conveyor belt systems based on conveyor drive rollers such as Van der Graaf Inc.'s SSV™ sanitary drum motors. In such conveyor drive rollers, surface features which are complementary to the surface features in the bottom surface 21 of the conveyor belt 15 are incorporated directly on to the rotatable cylinder of the conveyor drive roller. The rotatable cylinder forms part of the conveyor drive roller, which is a sealed unit, and is not intended to be removed for replacement. Such being the case, the only way for the operator to make use of the new version of the conveyor belt 15, having the different surface features in the bottom surface 21, would be to replace the entire conveyor drive roller, with a new conveyor drive roller having a rotatable cylinder that is compatible with the new version of the conveyor belt.

As mentioned above, this is an expensive proposition, both in terms of the costs of acquiring and installing the new conveyor drive roller(s), and the downtime needed to acquire and install the new conveyor drive roller(s). The downtime can be significant because such conveyor drive rollers are typically made to order to incorporate certain specifications needed to operate optimally in the operator's conveyor belt system, and so will take time for the conveyor drive belt system to be brought back online.

With continued reference to FIGS. 1 and 2, the conveyor drive roller 10 is similar to prior art conveyor drive rollers, such as for example, the motorized conveyor pulley disclosed in U.S. Pat. No. 6,443,295 to Hill, or the one disclosed in U.S. Pat. No. 6,837,364 to Kanaris, and therefore it is not necessary to get into the details of how to "motorize" the conveyor drive roller 10 according to embodiments of the present invention. Suffice it to say that the conveyor drive roller 10 has first and second stationary shafts 16, 18 for attachment to a conveyor belt system (not shown), which define longitudinal axis of rotation 20 of a rotatable center section 22.

Figure 8:
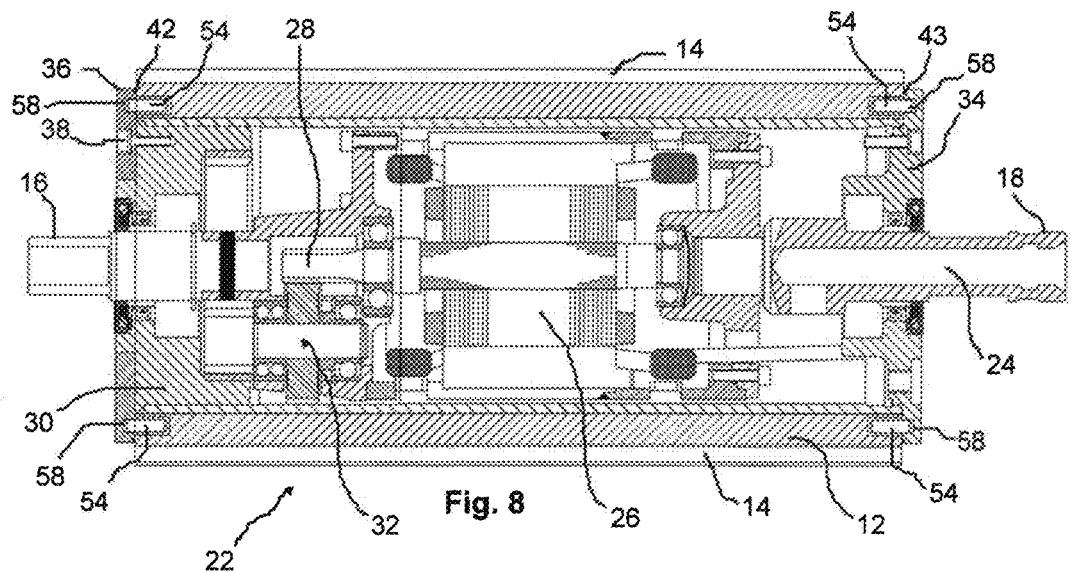
FIG. 8 is a cross-sectional view taken along line 8-8 of FIG. 1.

Referring briefly to the cross-sectional view in FIG. 8, one of the stationary shafts, in this example the rightmost stationary shaft 18, includes a hollow bore 24 for routing electrical wiring (not shown) from a controller (not shown) outside of the conveyor drive roller 10 to a motor 26 contained inside the center section 22 of the conveyor drive roller 10, to power and control the speed of the motor 26. The rotor 28 of motor 26 is operably connected to an end flange 30 carrying the first axel 16, through a geared transmission 32. A second end flange 34, opposite the first end flange 30, carries the second stationary shaft 18. With the stationary shafts 16, 18 fixedly attached to, for example the frame of a conveyor system (not shown), rotation of the rotor 28 of motor 26 when the motor 26 is electrified through the electrical wiring (not shown) causes the center section 22 to rotate about the longitudinal axis 20 defined by the stationary shafts 16,18.

Referring back to FIGS. 1 and 2, the center section 22 of the conveyor drive roller 10 includes a replaceable sleeve 12, which defines a conveyor drive surface 14, as mentioned above. A removable retainer 36 is attached to the first end flange 30 with 3 fasteners 38. As will be appreciated more or fewer fasteners 38 may be used to secure the retainer 36 to the first end flange 30, depending on the application. The retainer 36 is configured to secure the replaceable sleeve 12 to the rotatable body 40 in the center section 22 of the conveyor drive roller 10, as discussed next.

Referring now to FIGS. 4 and 5, the replaceable sleeve 12 may be removed from the conveyor drive roller 10 for replacement, by first removing the retainer 36 that is securing the replaceable sleeve 12 to the rotatable body 40 of the conveyor drive roller 10. This is accomplished by unscrewing, in this example, three threaded fasteners 38 to free the retainer 36, and then removing the retainer 36 from the conveyor drive roller 10.

Figure 9:
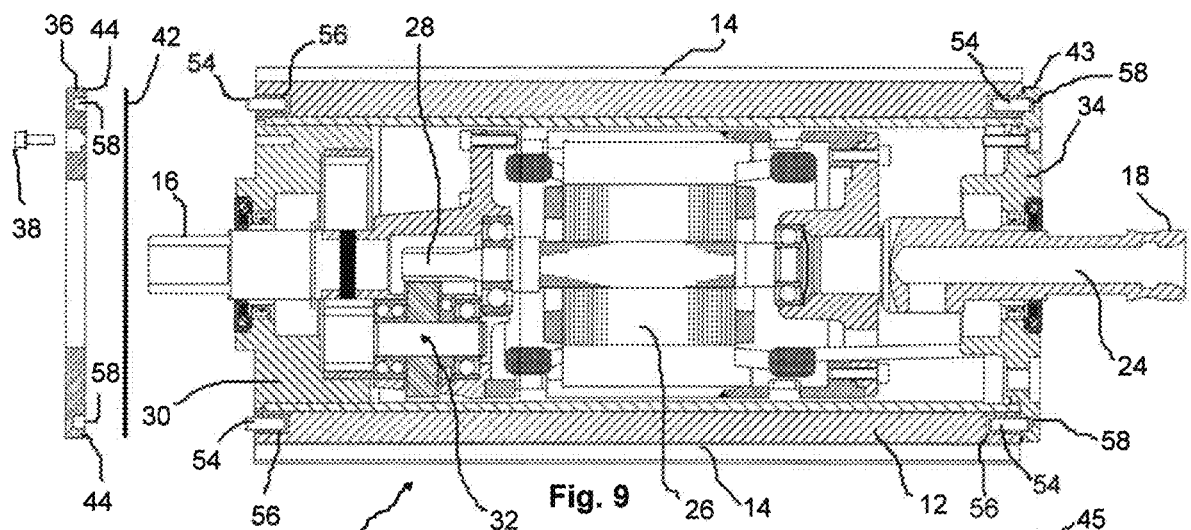
FIG. 9 is a cross-sectional view of FIG. 7, showing the retaining flange being removed.

FIG. 4 shows a seal 42 positioned between the retainer 36 and the replaceable sleeve 12. Preferably, the seal 42 may be an annular O-ring type seal provided at the edge of the retainer 36, which is also annular in this example, to help reduce or eliminate a crevice or other collection point for contaminants being formed between the retainer 36 and the replaceable sleeve 12. Preferably, the seal 42 may be made from natural rubber, or synthetic rubber, such as for example polybutadiene rubber, and nitrile butadiene rubber. As best seen in FIGS. 8 and 9, the seal 42 is preferably carried by an annular groove 44 formed in the retainer 36. However, it is contemplated that in other embodiments of the present invention the seal 42 may be carried by an annular groove 44 formed in the replaceable sleeve 12 instead. In other embodiments the annular grove 44 may be omitted, in which case the seal 42 may be free floating or attached to one of the retainer 36 and the replaceable sleeve 12 by some other known means. Furthermore, it is contemplated that the seal 42 may be omitted entirely in less preferred embodiments. All such embodiments are comprehended by the present invention.

Figure 10:
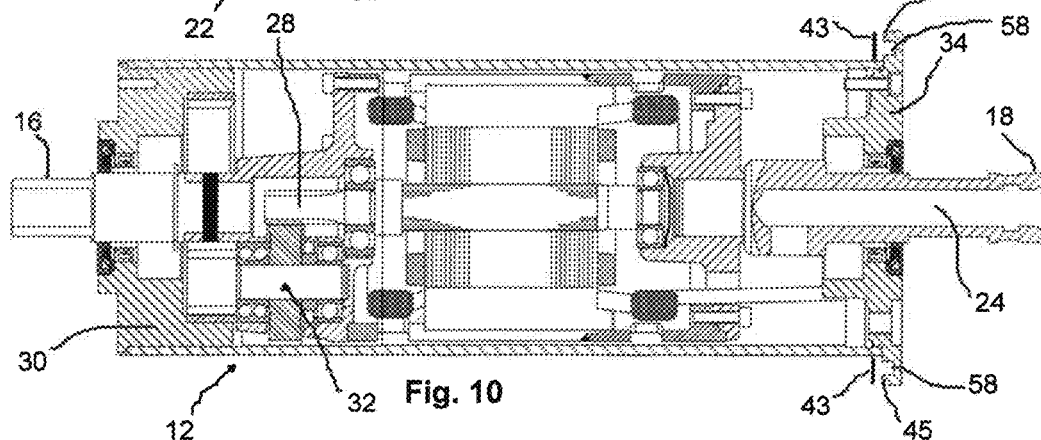
FIG. 10 is a cross-sectional view of FIG. 9, after the retaining flange and replaceable sleeve have been removed.

As best seen in FIGS. 8 to 10, a second seal 43 may be positioned at the opposite end of the conveyor drive roller 10, between the replaceable sleeve 12, and the second end flange 34. Preferably, the second seal 43 may be an annular O-ring type seal provided at the edge of the second end flange 34, which is also annular in this example, to help reduce or eliminate a crevice or other collection point for contaminants being formed between the replaceable sleeve 12 and the second end flange 34. Preferably, the second seal 43 may be made from natural rubber, or synthetic rubber, such as for example polybutadiene rubber, and nitrile butadiene rubber. Preferably, the second seal 43 may be carried by an annular groove 45 formed in the second end flange 34. However, it is contemplated that in other embodiments of the present invention the second seal 43 may be carried by an annular groove 45 formed in the replaceable sleeve 12 instead. In other embodiments the annular grove 45 may be omitted, in which case the second seal 43 may be free floating or attached to one of the replaceable sleeve 12 and the second end flange 34 by some other known means. Furthermore, it is contemplated that the second seal 43 may be omitted entirely in less preferred embodiments. All such embodiments are comprehended by the present invention.

With the retainer 36 removed, the replaceable sleeve 12 may be slid off from the rotatable body 40 of the conveyor drive roller 10. FIG. 5 shows the conveyor drive roller 10 with the retainer 36 and replaceable sleeve 12 removed, revealing the rotatable body 40 of the conveyor drive roller 10 that was covered by the replaceable sleeve 12 in FIGS. 1 and 4.

Preferably, the rotatable body 40 is cylindrical, and has an outside diameter which is less than the inside diameter of the replaceable sleeve 12, to facilitate easy removal of an old replaceable sleeve 12 from the rotatable body 40, and installation of a new replaceable sleeve 12 on to the rotatable body 40. As will be appreciated, the fit between the replaceable sleeve 12 and the rotatable body 40 should be sufficiently tight to prevent the replaceable sleeve 12 from vibrating or wobbling during operation of the conveyor drive roller. However, as will be explained next, contact between outer surface 46 of the rotatable body 40 and the inner surface 48 of the replaceable sleeve 12 is not required to rotate the replaceable sleeve 12 with the rotatable body 40. Good results have been obtained by providing a gap of about 1.5 thousandths of an inch between the outer surface 46 of the rotatable body 40, and the inner surface 48 of the sleeve 12, all along the circumference of the rotatable body 40.

Figure 6:
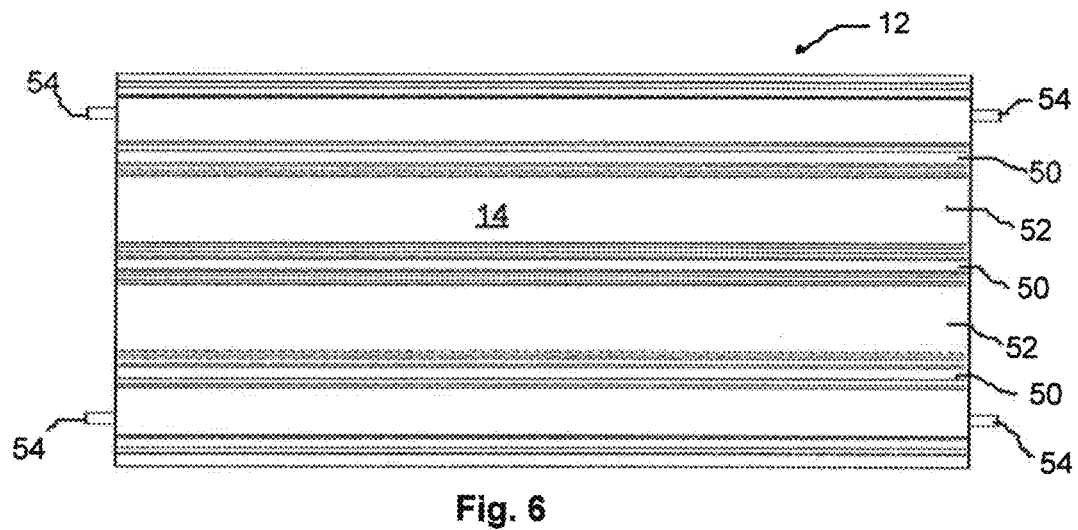
FIG. 6 is a front view of the replaceable sleeve removed from FIG. 5.

Referring now to FIG. 6, there is shown a front view of the replaceable sleeve 12 removed from the conveyor drive roller 10, according to an embodiment of the present invention. As can be seen, the replaceable sleeve 12 defines a conveyor drive surface 14, which is sized and shaped to operatively engage the bottom surface 21 of a compatible conveyor belt 15. Preferably, the replaceable sleeve 12 has a width that is substantially the same as width as the rotatable body 40, and present a conveyor drive surface 14 which has reduced, or no (most preferred) collection points for contaminants, in addition to being compatible with the conveyor belt 15.

By way of example, the conveyor drive surface 14 of the replaceable sleeve 12 shown in FIG. 6 is sized and shaped to engage the surface features in the bottom surface 21 of the prior art conveyor belt 15 shown in FIG. 3. In particular, the conveyor drive surface 14 includes transverse channels 50 and valleys 52 (best seen in FIG. 2) configured to engage the ridges 23 and hinges 25 of the exemplary conveyor belt 15 shown in FIG. 3.

Figure 7:
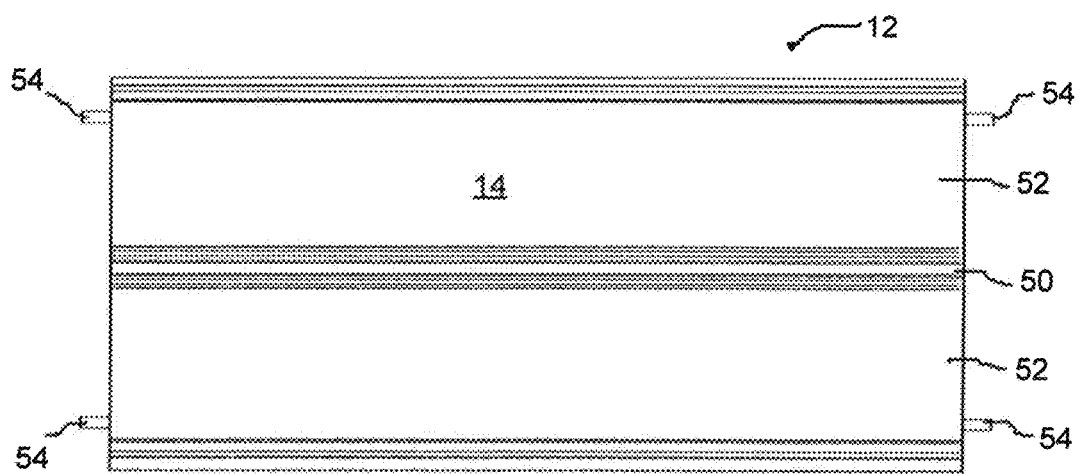
FIG. 7 is a front view of a replaceable sleeve according to another embodiment of the present invention.

For the sake of differentiation, FIG. 7 shows a front view of a hypothetical replaceable sleeve 12 according to another embodiment of the present invention, defining a conveyor drive surface 14 which is different from the conveyor drive surface 14 of the embodiment of the replaceable sleeve 12 shown in FIG. 6. As can be seen, the replaceable sleeve 12 shown in FIG. 7 defines a conveyor drive surface 14 with a different arrangement of transverse channels 50 and valleys 52 as compared to the replaceable sleeve 12 shown in FIG. 6.

Figure 11:
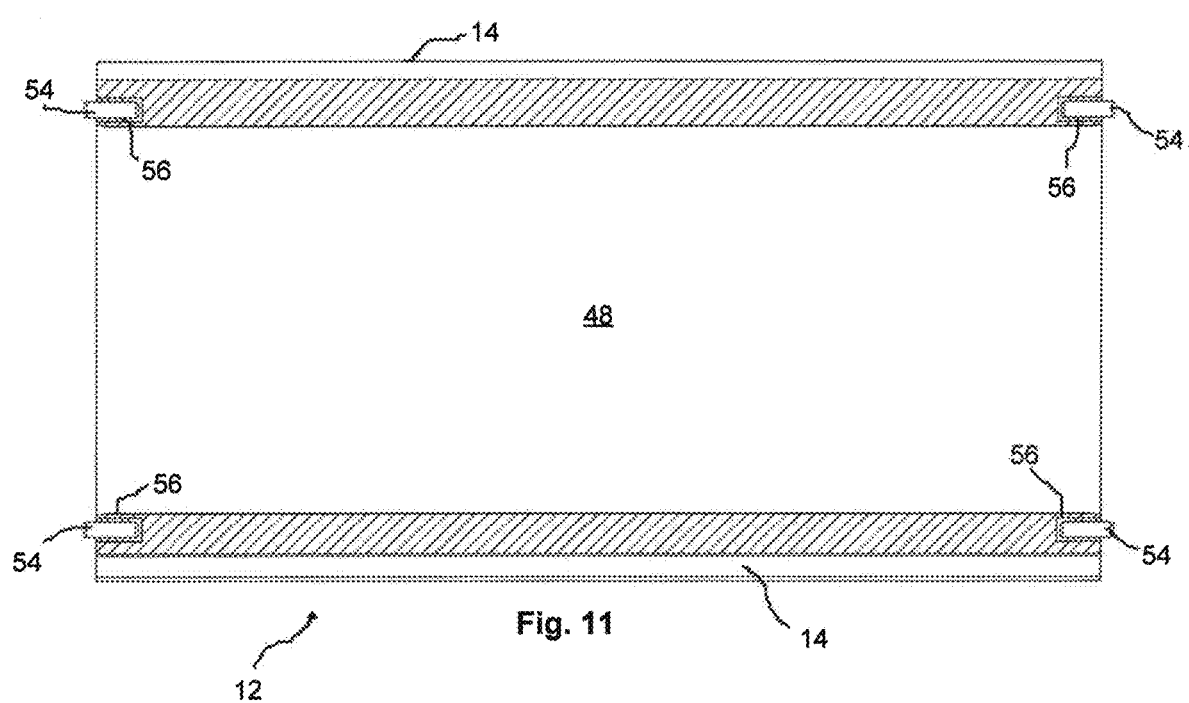
FIG. 11 is a cross-sectional view of the replaceable sleeve of FIG. 10.

Preferably, rotatable sleeve 12 will be locked in synchronous rotation with the rotatable body 40 using a plurality of pins 54 between the replaceable sleeve 12 and the retainer 36 on one end, and the replaceable sleeve 12 and the second end flange 34 on the opposite end. As best seen in FIG. 11, the pins 54 may be carried by respective sockets 56 machined into the ends of the replaceable sleeve 12. Preferably, the pins 54 may be retained in the sockets 56 on the replaceable sleeve 12 with an interference fit coupling, sufficient to prevent the pins 54 from falling out and being lost during removal and replacement of the replaceable sleeve 12. What is important is that the pins 54 and sockets 56 are sized so that when one end of each pin 54 is inserted in its respective bore 56 the other end of the pin 54 protrudes from the replaceable sleeve 12 sufficient to engage a complementary bore 58 positioned in the retainer 36 or the second end flange 34, as best seen in FIGS. 8 and 9. Preferably the pins 54 may be made of stainless steel. It will be appreciated that the number and size of the pins 54 will depend on the particular application. What is important is that the pins 54 used are sufficiently robust to handle the forces applied to them when transmitting torque from the retainer 36 and second end flange 34, to the replaceable sleeve 12, without bending or shearing. By way of example, six pins 54 are provided in each side of the replaceable sleeve 12 shown in the exemplary drawings.

As best seen in FIG. 5, the second end flange 34 includes a retainer portion 60 which extends radially out above the outer surface 46 of the rotatable body 40. As best seen in FIG. 8, the sockets 58 are contained in this retainer portion 60, together with the annular groove 45 for the second seal 43 discussed above. Accordingly, it can now be understood that the replaceable sleeve 12 is secured on the rotatable body 40 between the retainer 36 and the retainer portion 60 of the second end flange 34, according to a preferred embodiment of the present invention.

Although in this example used to describe the present invention, the pins 54 are shown as being retained by sockets 56 in the replaceable sleeve 12, it is contemplated that the some or all pins 54 may be retained by sockets 58 in the retainer 36 and/or the second end flange 34.

It will now be understood that with the replaceable sleeve 12 installed on the rotatable body 40 of the conveyor drive roller 10, and secured in place with the retainer 36, rotation of the rotatable body synchronously rotates the removable sleeve 12. This is because on one end of the conveyor drive roller 10, the retainer 36 is fastened to the first end flange 30 with fasteners 38, which is in turn mechanically pinned to the replaceable sleeve 12 with pins 54, and on the opposite end of the conveyor drive roller 10, the retainer portion 60 of the second end flange 34 is also mechanically pinned to the replaceable sleeve 12 with pins 54.

Referring now to FIG. 12, there is shown a conveyor drive roller 10 according to another embodiment of the present invention. In this embodiment, the replaceable sleeve 12 extends the full length of the rotatable body 40, and covers the removable retainer 36 and the retainer portion 60 of the second end flange 34. As can be seen, the ends 68, 70 of the replaceable sleeve 12 are sized and shaped to accommodate the removable retainer 36 and the retainer portion 60, so that the removable retainer 36 and the retainer portion 60 are nested in the ends 68, 70 of the replaceable sleeve 12.

As above, the conveyor drive roller 10 according to this embodiment is also adapted for driving a conveyor belt 15 in a conveyor system (not shown). Preferably, the conveyor drive roller 10 may be provided with an internal electric motor 26, and a geared transmission 32, as is known in the art for example as disclosed in U.S. Pat. No. 6,837,364 to Kanaris. It should be noted that for ease of illustration, the internal elements of the conveyor drive roller 10, such as the motor 26, the geared transmission 32, and electrical wiring, etc., already described above, have been omitted from the figure as they are not necessary for understanding the present invention. Stationary shafts 16, 18 are configured to be fixedly attached to the frame of a conveyor system (not shown), such that when the motor is electrified through the electrical wiring the center section 22 rotates about the longitudinal axis 20 defined by the stationary shafts 16,18.

Although the conveyor drive rollers 10 shown in FIG. 8 and FIG. 12 is of the type having an internal electric motor 26, which is also referred to as a drum motor, the invention is not so limited. For example, it is contemplated that the conveyor drive roller 10 may be provided with an external electric motor in other embodiments of the present invention. In this regard, two such conveyor drive rollers with external electric motors have been disclosed in U.S. Pat. No. 7,806,252 to Kanaris. Accordingly, the conveyor drive roller 10 may have an electric motor 26 sealed inside the rotatable body 40 for rotating the rotatable body. Alternatively, the conveyor drive roller 10 may have the electric motor located outside of the rotatable body. Furthermore, the conveyor drive roller 10 may include a geared transmission 32 for operatively connecting the electric motor 26 to the rotatable body 40. Similarly, the geared transmission 32 may be sealed inside the rotatable body, or outside the rotatable body 40. The geared transmission 32 may also extend from inside the rotatable body 40 to outside the rotatable body 40 for coupling an external electric motor. All such embodiments are comprehended by the present invention.

The center section 22 of the conveyor drive roller 10 includes a replaceable sleeve 12, which defines a conveyor drive surface 14, as mentioned above. The removable retainer 36 is attached to the first end flange 30 with a plurality of fasteners 38. The second end flange 34 includes a retainer portion 60 which extends radially outward from the outer surface 46 of the rotatable body 40, as also mentioned above.

The replaceable sleeve 12 is secured on the rotatable body 40 between the retainer 36 and the retainer portion 60 of the second end flange 34, according to a preferred embodiment of the present invention. Referring now to FIG. 13, the removable retainer 36, and the retainer portion 60 of the second end flange 34, which are configured to retain the replaceable sleeve 12 on the rotatable body 40 of the conveyor drive roller 10, can be more clearly seen. The plurality of fasteners 38 used to removably attach the removable retainer 36 to the first end flange 30 of the rotatable body 40, can also be seen more clearly. Although the retainer portion 60 of the second end flange 34 is fixedly attached to the rotatable body 40 in this embodiment (e.g. the retainer portion 60 forms a part of the second end flange 34), it is contemplated that the retainer portion 60 may also be removably attached to the rotatable body 40 (i.e. in the form of a second removable retainer (not shown)) with fasteners 38, in other embodiments of the invention. Preferably, the fasteners 38 may be threaded fasteners such as bolts, which can be removed with hand tools such as wrenches, screwdrivers, and the like, as well as power tools such as impact drivers and wrenches, drill drivers, and the like. The replaceable sleeve 12 preferably defines a continuous conveyor drive surface 14 extending between the removable retainer 36 and the retainer portion 60. In this example, the conveyor drive surface 14 extends the full length of the rotatable body 40, and covers the removable retainer 36 and the retainer portion 60 of the second end flange 34.

As described above, using threaded fasteners 38 is the preferred way of attaching the removable retainer 36, and optionally the second removable retainer (not shown), to the rotatable body 40 for retaining the replaceable sleeve 12 on the rotatable body 40. However, having the benefit of the present disclosure, persons skilled in the art will recognize other ways of attaching the removable retainer 36 and optionally the second removable retainer (not shown). For example, the removable retainer 36 may be attached to the rotatable body 40 using a threaded joint comprising threads on a central bore of the removable retainer 36 and a matching threaded portion on the stationary shaft 16. All such embodiments are comprehended by the present invention.

Compressible O-ring seals 42 are preferably provided to plug crevices where contaminants might otherwise accumulate. In this example, annular O-ring seals 42 are provided between the replaceable sleeve 12 and the removable retainer 36, between the removable retainer 36 and the first end flange 30 of the rotatable body 40, and between the retainer portion 60 extending from the second end flange 34 of the rotatable body 40. The O-ring seals 42 are retained in grooves 44.

The replaceable sleeve 12 is rotationally locked to a rotation of the rotatable body 40. This may be achieved by positioning at least one locking member between the replaceable sleeve 12 and the rotatable body 40, or between the replaceable sleeve 12 and the removable retainer 36, or between the replaceable sleeve 12 and the retainer portion 60, or operative combinations thereof.

The preferred locking member is a pin, as noted above. Most preferably, the locking member is a cylindrical shaped pin 54. However, the locking member may take other forms, what is important is that the locking member a) projects from either the removable retainer 36 or the retainer portion 60 to engage the end 68 of the replaceable sleeve 12 adjacent the removable retainer 36 or the end 70 of the replaceable sleeve 12 adjacent the retainer portion 60, or b) the locking member projects from the replaceable sleeve 12 to engage the adjacent removable retainer 36 or retainer portion 60, such that rotational movement of the rotatable body 40 translates into rotational movement of the replaceable sleeve 12. In other words, the interaction of the locking member with the removable retainer 36 and/or the retainer portion 60 on the one hand and the replaceable sleeve 12 on the other hand, results in the replaceable sleeve 12 and the rotational body 40 being rotationally locked together. With this understanding, the person skilled in the art will be able to recognize numerous suitable locking members, including variously shaped elongate members suitable for projecting into matching voids provided on the removable retainer 36, the retainer portion 60, the ends 68, 70 of the replaceable sleeve 12, or combinations thereof.

As best seen in FIGS. 12 and 13, a first plurality of pins 54 is preferably positioned between the removable retainer 36 and one end 68 of the replaceable sleeve 12, adjacent the removable retainer 36. Additionally, a second plurality of pins 54 is preferably positioned between the retainer portion 60 of the second end flange 34 and the other end 70 of the replaceable sleeve 12, adjacent the retainer portion 60. As best seen in FIG. 13, the pins 54 are preferably attached to the removable retainer 36 and the retainer portion 60, and this may be done by press fitting them into sockets 56.

However, it is contemplated that the first plurality of pins 54 may be attached to the one end 68 of the replaceable sleeve 12, and the removable retainer 36 may have a plurality of first pin sockets 56 sized and positioned on the removable retainer 36 for receiving the first plurality of pins 54, in other embodiments. Similarly, the second plurality of pins 54 may be attached to the other end 70 of the replaceable sleeve 12, and the retainer portion 60 may have a plurality of second pin sockets 56 sized and positioned on the retainer portion 60 for receiving the second plurality of pins 54. Moreover, having the benefit of this disclosure, persons skilled in the art will recognize other operative combinations of pins 54 and sockets. All such embodiments are comprehended by the present invention.

As can also be seen in FIGS. 12 and 13, the one end 68 of the replaceable sleeve 12 has a first plurality of pin sockets 56 sized and positioned on the one end 68 for receiving the first plurality of pins 54 projecting from the removable retainer 36. Similarly, the other end 70 of the replaceable sleeve 12 has a second plurality of pin sockets 56 sized and positioned on the other end 70 for receiving the second plurality of pins 54 projecting from the retainer portion 60 of the second end flange 34.

With reference to FIGS. 13 to 15, there is shown that the rotatable body 40 is a cylinder according to a preferred embodiment, and the replaceable sleeve 12 has a matching cylindrical bore that may be slid over the cylindrical shaped rotatable body 40 and pressed against the retainer portion 60 of the second end flange 34 with the pins 54 engaging the sockets 56 on the end 70 of the replaceable sleeve 12, adjacent the retainer portion 60. With the replaceable sleeve 12 in position on the rotatable body 40, the removable retainer 36 may be attached to the first end flange 30 of the rotatable body 40, with its pins 54 engaging respective sockets 56 on the one end 68 of the replaceable sleeve 12, adjacent the removable retainer 36, and secured with fasteners 38, thereby retaining the replaceable sleeve 12 on the rotatable body 40, between the removable retainer 36 and the retainer portion 60 of the second end flange 34.

Figure 16:
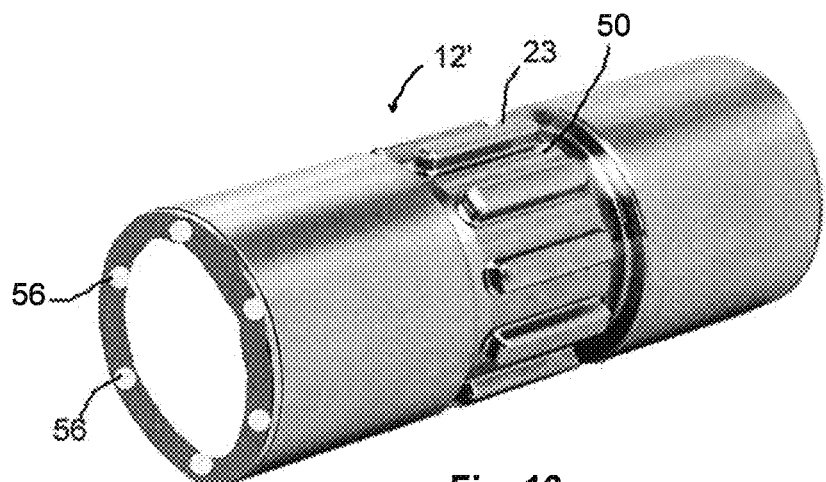
FIGS. 16-18 are perspective views of replaceable sleeves according to other embodiments of the present invention.
Figure 17:
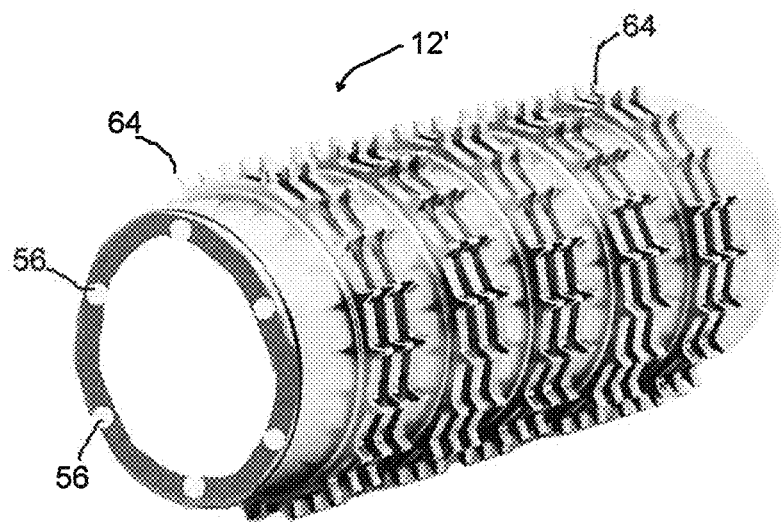
Figure 18:
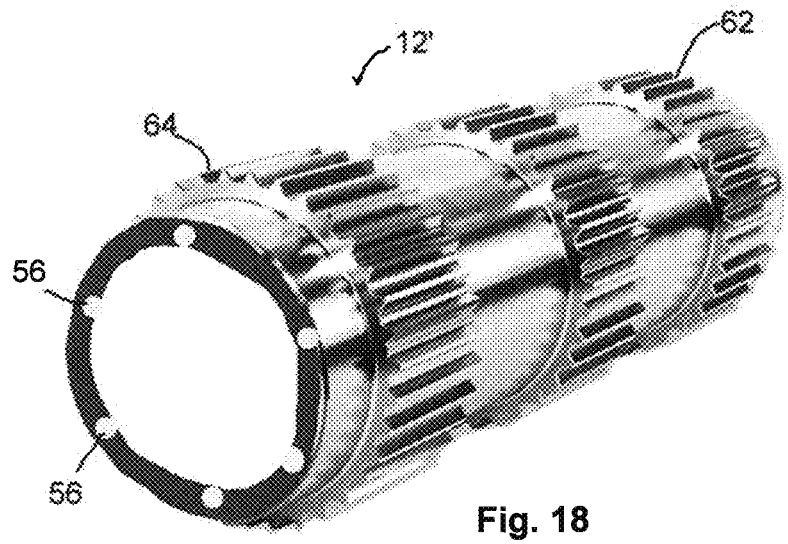

Accordingly, the replaceable sleeve 12 may be easily removed and replaced with another replaceable sleeve 12', according to the present invention. Examples of three other replaceable sleeves 12' are shown in FIGS. 16 to 18. As can be seen, the conveyor drive surfaces 14 of these three other replaceable sleeves 12' are shaped to engage different surface features that may be present on the bottom surfaces 21 of three different conveyor belts 15. For example, the shape of the conveyor drive surface 14 may contain ridges 23, channels 50, valleys 52, gears 62, sprockets 64, teeth 66, and combinations thereof. What is important is that the shape of the conveyor drive surface 14 is suitable for engaging surface features on the bottom surface 21 of the conveyor belt 15, such as ridges 23, channels 50, valleys 52, gears 62, sprockets 64, teeth 66, connectors such as hinges 25, and combinations thereof.

While reference has been made to various preferred embodiments of the invention other variations, implementations, modifications, alterations, and embodiments are comprehended by the broad scope of the appended claims. Some of these have been discussed in detail in this specification and others will be apparent to those skilled in the art. Those of ordinary skill in the art having access to the teachings herein will recognize these additional variations, implementations, modifications, alterations, and embodiments, all of which are within the scope of the present invention, which invention is limited only by the appended claims.

I claim:

1. A conveyor drive roller for driving a conveyor belt in a conveyor system, said conveyor drive roller comprising:
   a rotatable body associated with a means to rotate said rotatable body;
   a pair of retainers attached to opposed first and second ends of said rotatable body, at least one of said retainers being removably attached to said rotatable body; and
   a replaceable sleeve releasably retained on said rotatable body by said removable retainer and said other retainer, said replaceable sleeve defining a continuous conveyor drive surface extending between said removable retainer and said other retainer;
   wherein said replaceable sleeve is rotationally locked to a rotation of said rotatable body.

2. The conveyor drive roller of claim 1, comprising at least one locking member positioned a) between said replaceable sleeve and said rotatable body, b) between said replaceable sleeve and said at least one retainer, c) between said replaceable sleeve and said other retainer, or d) an operative combination thereof;
   wherein said at least one locking member is adapted for rotatably locking said replaceable sleeve to said rotation of said rotatable body.

3. The conveyor drive roller of claim 2, wherein said at least one member comprises a first plurality of pins positioned between said at least one removable retainer and a first end of said replaceable sleeve.

4. The conveyor drive roller of claim 3, wherein said at least one member comprises a second plurality of pins positioned between said other retainer and a second end of the replaceable sleeve.

5. The conveyor drive roller of claim 4, wherein:
   a) said first plurality of pins are attached to said at least one removable retainer, and said first end of said replaceable sleeve comprises a plurality of first pin sockets sized and positioned on said first end for receiving said first plurality of pins;
   b) said second plurality of pins are attached to said other retainer, and said second end of said replaceable sleeve comprises a plurality of second pin sockets sized and position on said second end of said replaceable sleeve for receiving said second plurality of pins;
   c) said first plurality of pins are attached to said first end of said replaceable sleeve, and said at least one removable retainer comprises a plurality of first pin sockets sized and positioned on said removable retainer for receiving said first plurality of pins;
   d) said second plurality of pins are attached to said second end of said replaceable sleeve, and said other retainer comprises a plurality of second pin sockets sized and position on said other retainer for receiving said second plurality of pins; or
   e) an operative combination thereof.

6. The conveyor drive roller of claim 3, wherein said first and second ends of said replaceable sleeve cover said removable retainer and said other retainer.

7. The conveyor drive roller of claim 1, wherein said means to rotate said rotatable body comprises an electric motor operatively coupled to said rotatable body.

8. The conveyor drive roller of claim 7, wherein said electric motor is sealed inside said rotatable body.

9. The conveyor drive roller of claim 7, wherein said electric motor is located outside of said rotatable body.

10. The conveyor drive roller of claim 8, further comprising a geared transmission for operatively connecting said electric motor to said rotatable body.

11. The conveyor drive roller of claim 10, wherein said geared transmission is sealed inside said rotatable body.

12. The conveyor drive roller of claim 1, wherein said at least one removable retainer is attached to said first end of said rotatable body with at least one threaded fastener.

13. The conveyor drive roller of claim 1, further comprising:
   a) a compressible seal between said at least one removeable retainer and said first end of said replaceable sleeve;

b) a compressible seal between said at least one removeable retainer and said first end of said rotatable body;

c) a compressible seal between said other retainer and said second end of said replaceable sleeve; or d) an operative combination thereof.

14. The conveyor drive roller of claim 1, further comprising a pair of stationary shafts extending outwardly from said rotatable body, for attaching said conveyor drive roller to a frame of said conveyor system.

15. The conveyor drive roller of claim 1, wherein a bottom of said conveyor belt comprises surface features, and wherein said conveyor drive surface is shaped to engage said surface features.

16. The conveyor drive roller of claim 15, wherein said conveyor drive surface comprises ridges, channels, valleys, gears, sprockets, teeth, or a combination thereof.

17. The conveyor drive roller of claim 15, wherein said surface features comprise ridges, channels, valleys, gears, sprockets, teeth, connectors, or a combination thereof.

18. A method of replacing a conveyor drive surface on a conveyor drive roller, said method comprising the steps of:
   providing said conveyor drive roller, said conveyor drive roller including:
      a rotatable body associated with a means to rotate said rotatable body;
      a pair of retainers attached to opposed first and second ends of said rotatable body, at least one of said retainers being removably attached to said rotatable body; and
      a replaceable sleeve releasably retained on said rotatable body by said removable retainer and said other retainer, said replaceable sleeve defining a continuous conveyor drive surface extending between said removable retainer and said other retainer and said replaceable sleeve is rotationally locked to a rotation of said rotatable body;
   removing said at least one removable retainer from said rotatable body with a tool;
   removing said replaceable sleeve from said rotatable body;
   placing another replaceable sleeve on said rotatable body; and
   securing said at least one removable retainer to said rotatable body with said tool.

19. The method of claim 18, wherein said step of providing said conveyor drive roller includes removing said conveyor drive roller from said frame of said conveyor system.

20. The method of claim 18, wherein said conveyor drive surface of said replaceable sleeve is shaped to engage surface features on a bottom of said conveyor belt; and
   wherein said another replaceable sleeve defines another conveyor drive surface having a different shape compared to said conveyor drive surface of said replaceable sleeve;
   whereby said another replaceable sleeve is capable of engaging different surface features on a bottom of a different conveyor belt.

21. A conveyor drive roller for driving a conveyor belt in a conveyor system, said conveyor drive roller comprising:
   a rotatable body;
   an electric motor operatively coupled to said rotatable body for rotating said rotatable body;
   at least one retainer attached to an opposed first or second end of said rotatable body, said at least one retainer being removably attached to said rotatable body; and
   a replaceable sleeve releasably retained on said rotatable body by said at least one retainer, said replaceable sleeve defining a continuous conveyor drive surface extending between said opposed first and second ends of said rotatable body;
   wherein when said at least one retainer is attached to said opposed first or second end of said rotatable body, said replaceable sleeve is rotationally locked to a rotation of said rotatable body by said at least one retainer.

22. The conveyor drive roller of claim 21, wherein said electric motor is sealed inside said rotatable body.

* * * * *